Jan. 5, 1971                  D. VOLK                 3,552,837

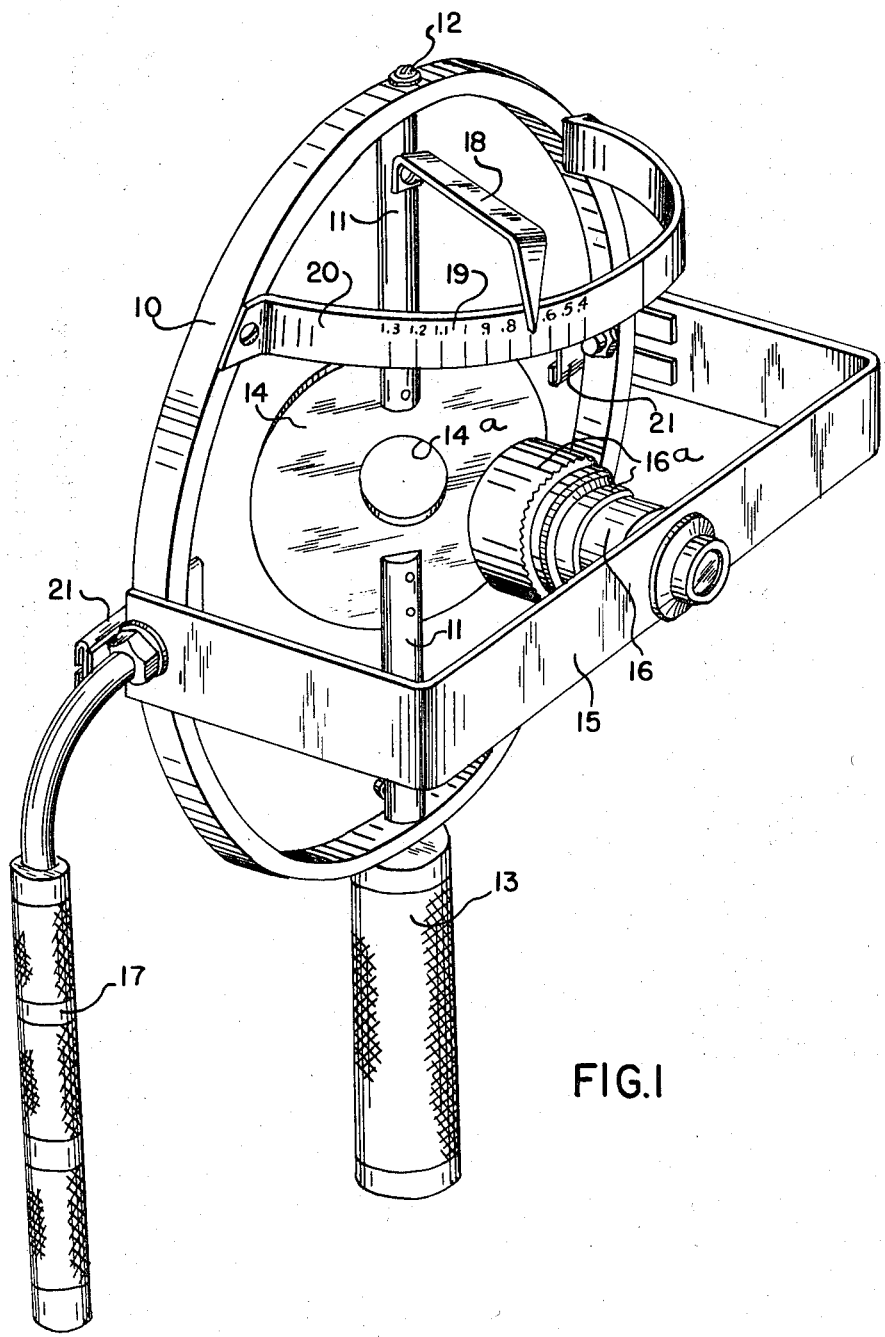
FIG.I

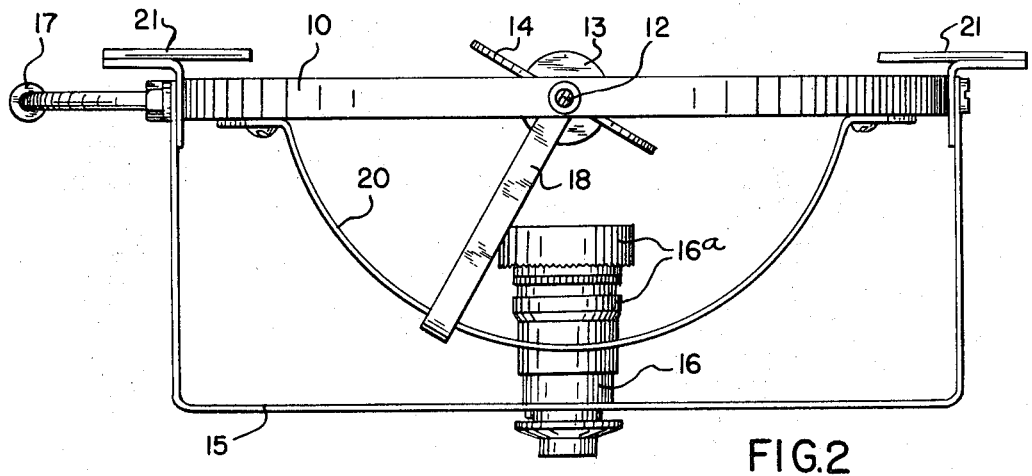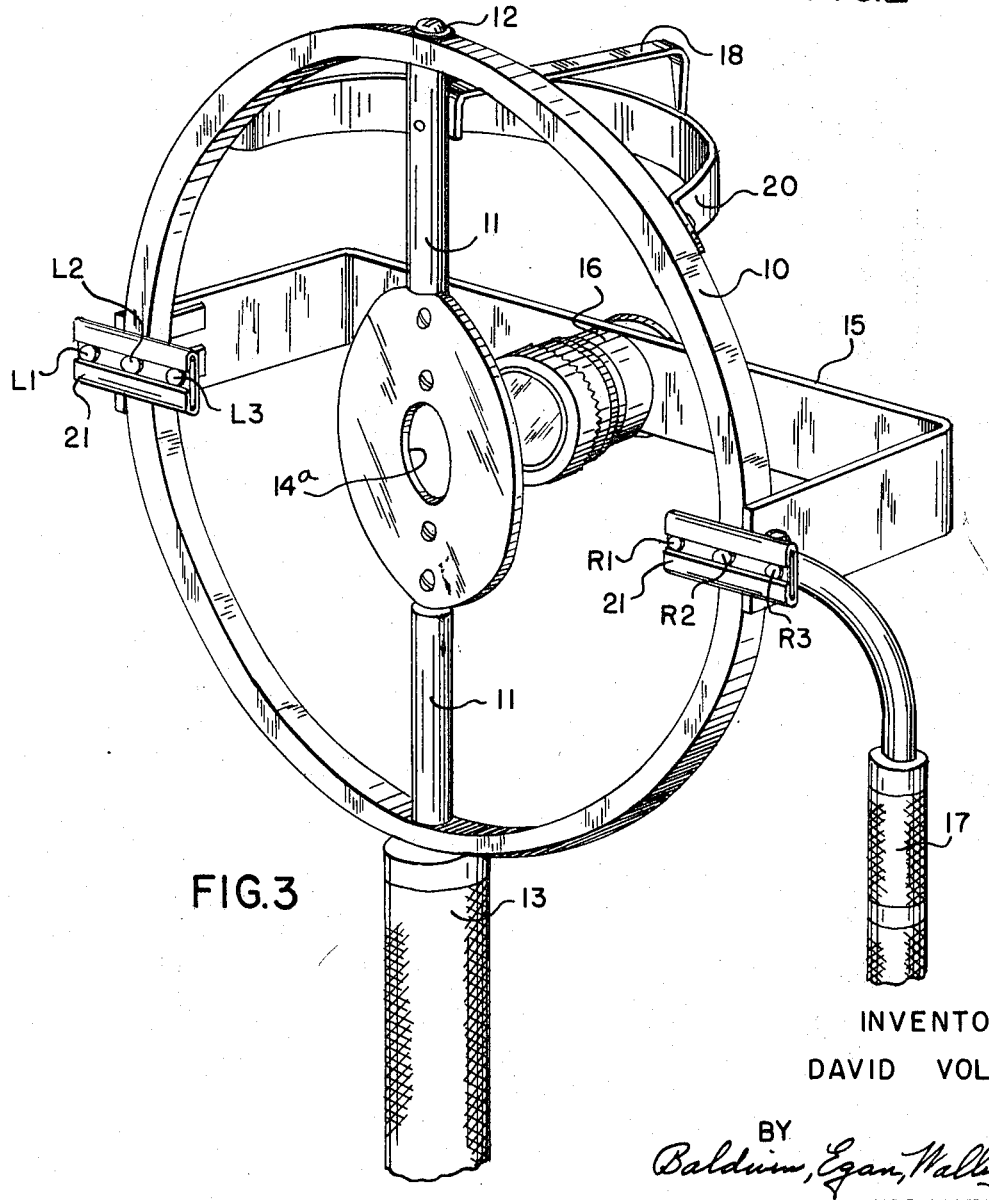

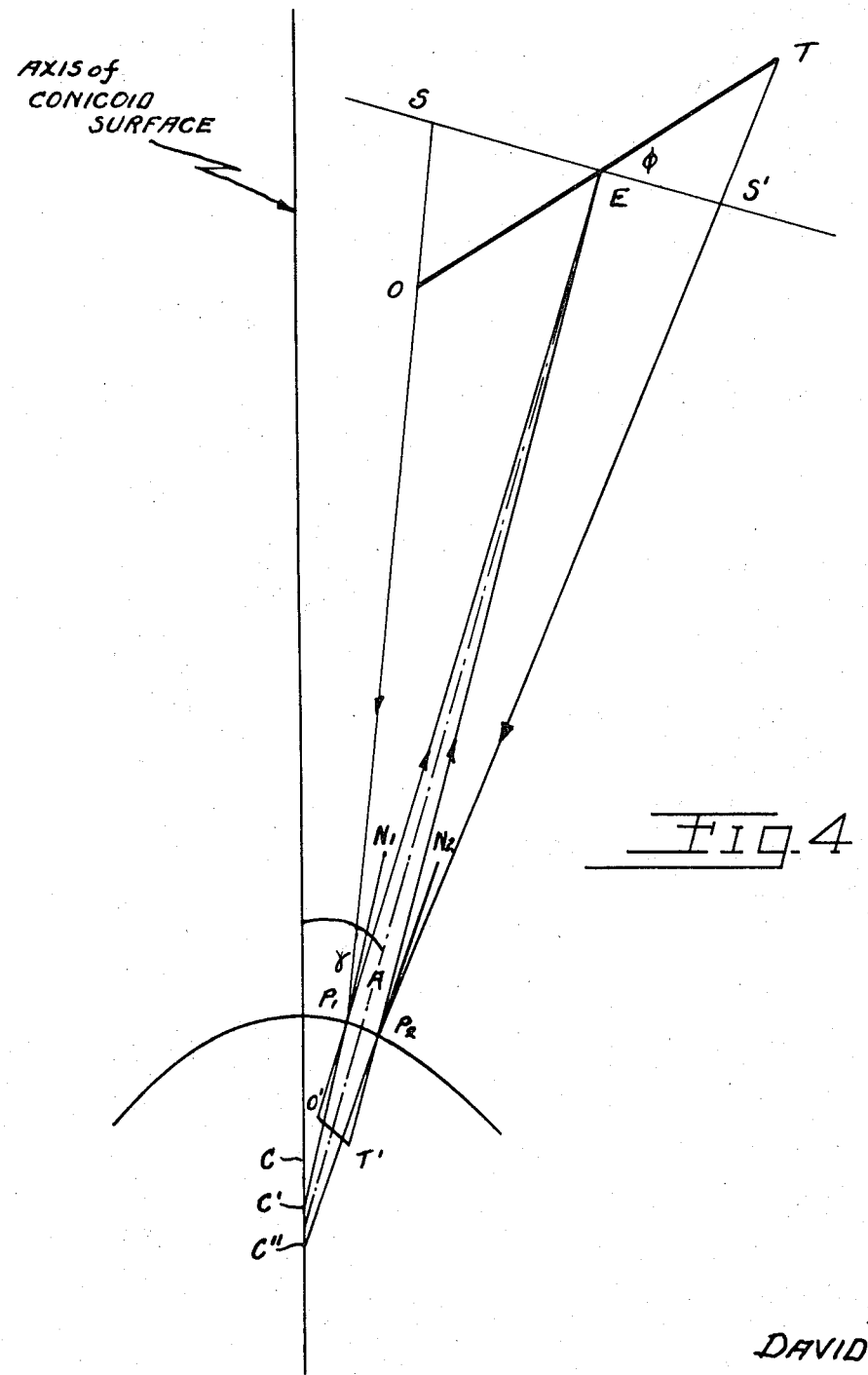

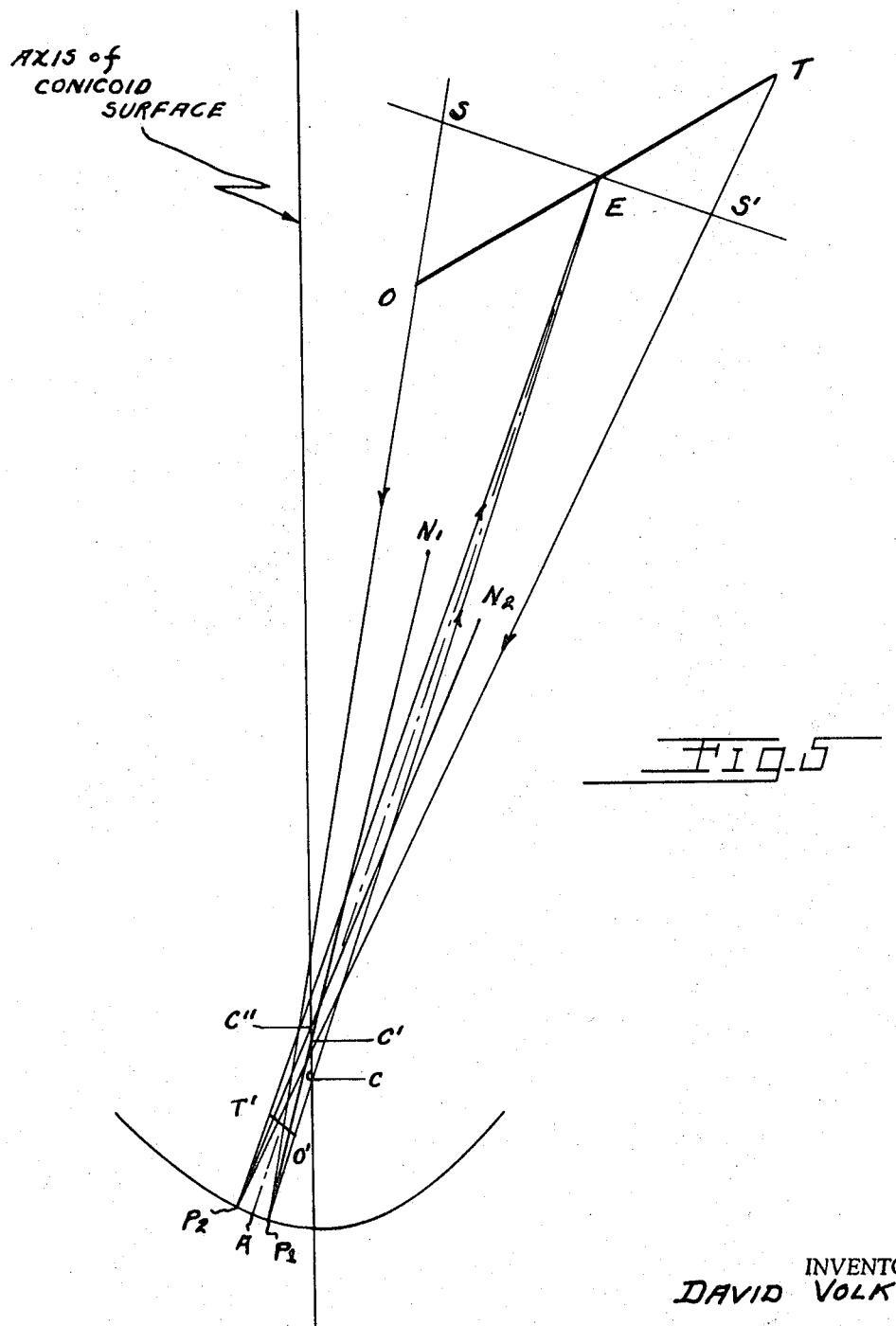

HAND-HELD APPARATUS FOR DETERMINING THE
ECCENTRICITY OF A CORNEA

Filed Nov. 26, 1968                        6 Sheets-Sheet 5

INVENTOR
DAVID VOLK

BY

Baldwin, Egan, Walling & Fetzer
ATTORNEYS

INVENTOR
DAVID VOLK
BY
Baldwin, Egan, Walling & Fetzer
ATTORNEYS

United States Patent Office 3,552,837
Patented Jan. 5, 1971

3,552,837
HAND-HELD APPARATUS FOR DETERMINING THE ECCENTRICITY OF A CORNEA
David Volk, 2460 Fairmount Blvd., Cleveland, Ohio 44106
Continuation-in-part of application Ser. No. 689,164, Dec. 8, 1967. This application Nov. 26, 1968, Ser. No. 778,950
Int. Cl. A61b 3/10
U.S. Cl. 351—13               1 Claim

ABSTRACT OF THE DISCLOSURE

There is presented a unitary hand-held apparatus for determining the shape of the anterior surface of the human cornea in terms of the eccentricity of conicoids of revolution which approximate the shape of the cornea, in wich an illuminated circular target is presented to a nonapical portion of said cornea, rotated a given angle, and the reflected image of said target is observed through a telescope whose optical axis forms a given angle with the optical axis of said cornea, the center of said circular target lying on the optical axis of said telescope, and said circular target being rotatable about a diameter thereof which is perpendicular to the optical axis of said telescope, said target being rotated about said diameter until said image appears substantially as a circle, and using that angle of rotation of said target to determine the eccentricitry of the cornea.

---

This application is a continuation-in-part of my pending application Ser. No. 689,164, filed Dec. 8, 1967 for Method and Apparatus for Determining the Eccentricity of a Conicoid Surface.

It is known that the anterior surface of the human cornea is not spherical, but tends to decrease in curvature from the most highly curved central portion to the periphery. The known corneal shapes can be closely approximated by conicoids of revolution, including prolate ellipsoids, paraboloids, and hyperboloids of revolution. In those instances where the cornea has two principal meridians, each principal section may resemble a conic. As a consequence of the similarity in shape of the cornea to conicoids of revolution, and to resembling surfaces with two principal meridians, each principal section of which resembles a conic, one is justified in specifying the shape of the cornea, in one or more principal directions, in terms of eccentricity. Hereinafter, I will describe the shape of the cornea in terms of eccentricity, or in terms of the eccentricity in one or both of the principal meridians.

In the drawings:

FIG. 1 is a perspective view of the hand-held apparatus of this invention taken from the rear thereof;

FIG. 2 is a top plan view of the apparatus of FIG. 1;

FIG. 3 is a perspective view of the same apparatus taken from the front;

FIG. 4 is a schematic diagram of a circular target rotated to provide a circular image on a conicoid reflecting surface of positive curvature;

FIG. 5 is a schematic diagram of a circular target rotated to provide a circular image on a conicoid reflecting surface of negative curvature;

FIG. 9 is a side elevational view of the structure shown in FIG. 8 taken from the line 9—9 of that figure; while FIG. 10 is a top plan view of FIG. 8.

Figure 6:
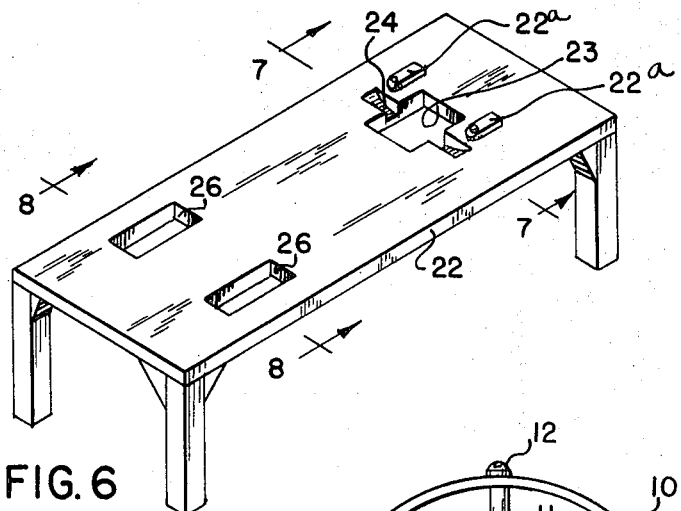
FIG. 6 is a perspective view of a table providing means for supporting the hand-held apparatus when examining a lens and means in the table for mounting a lens holder.

FIGS. 1, 2 and 3 show the hand-held instrument of this invention. It comprises a base ring 10 having a target holding shaft 11 extending through a diameter of the ring or hollow frame generally vertical, the shaft being rotatable in the ring and held in position by a screw 12 at the top. At the lower end of the shaft, it is provided with a main handle 13 rotatable with shaft 11. A target disc 14 is held by shaft 11 substantially concentric with the ring 10. The target disc has a sighting opening 14a through the center thereof. A telescoping holding bracket 15 generally U-shape, is rigidly secured to the base ring 10 and supports a telescope 16 whose optical axis intersects the vertical diameter of target 14 and passes through the center of the opening 14a. The holder for the objective lens of the telescope is indicated at 16a and is rotatable about the axis of the telescope for focusing functions as is usual. The main body of the telescope 16 is firmly held in the bracket 15. An auxiliary handle 17 is firmly secured to the base ring 10 preferably at the middle of one side thereof as shown in FIG. 1. In use of the apparatus, it is firmly held by the handle 17 while the handle 13 is rotated or oscillated to change the inclination of the target 14 relative to the principal axis of the telescope. This rotative movement of the target is indicated by means of a pointer 18 which is firmly fixed to the shaft 11 and indicates the position thereof on indicia 19 on a generally semi-circular bracket 20 secured to the base ring. The target 14 is either self-luminous or means is provided to illuminate the same in use of the apparatus.

Referring to FIG. 3, holders 21 are fixed to opposite sides of the ring 10, substantially on a horizontal diameter thereof, to support fixation points L1, L2 and L3 at the left-hand side and corresponding points R1, R2 and R3 at the right-hand side, although such points could be provided in some other manner, if desired.

The apparatus of FIGS. 1, 2 and 3 is utilized when examining the human cornea. If it is desired to determine the eccentricity of a lens, means is provided in FIGS. 6 through 10 for this purpose. A table 22 as shown in FIG. 6 is provided with a through opening 23 through which the handle 13 of the sighting apparatus may be passed. It is also provided with laterally extending slots 24 in which the ring 10 may rest. Rotatable clips 22a are provided which may be rotated 180° from the position of FIG. 6 to hold the ring 10 in position on the table. At the opposite end, the table has two parallel slots 26 to receive a lens holder.

Figure 7:
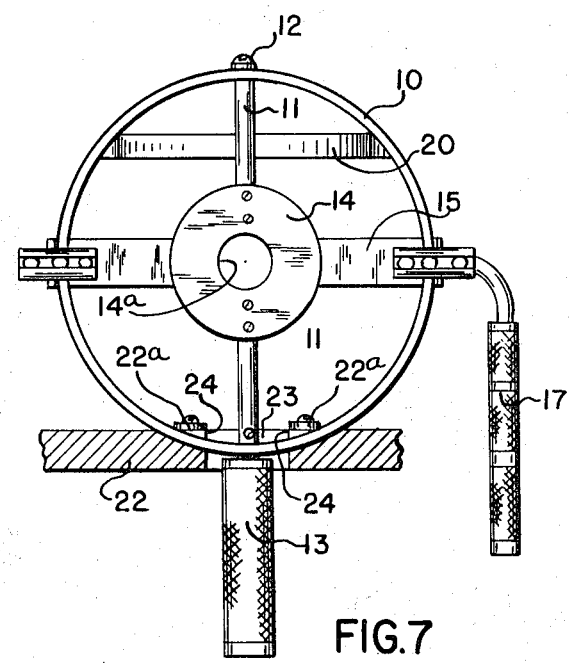
FIG. 7 is a sectional view taken along the line 7—7 of FIG. 6 with the hand-held apparatus of FIGS. 1, 2 and 3 in place thereon.

FIG. 7 shows the device of FIGS. 1, 2 and 3 in position on the table 22, held in place by rotatable clips 22a.

Figure 8:
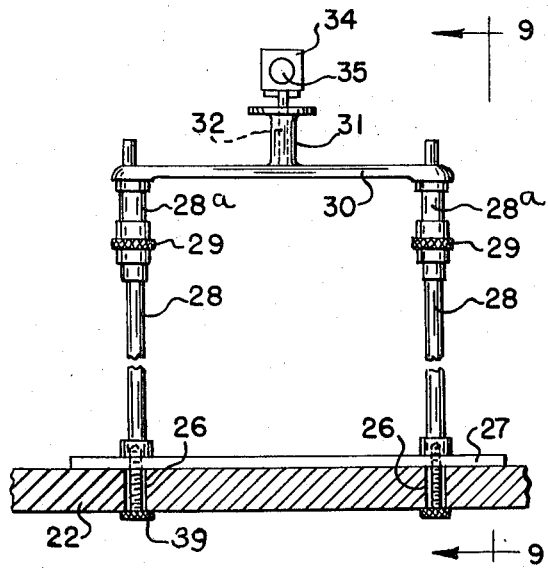
FIG. 8 is a sectional view taken along the line 8—8 of FIG. 6 showing a lens holder in position on the table.
Figures 9, 10:
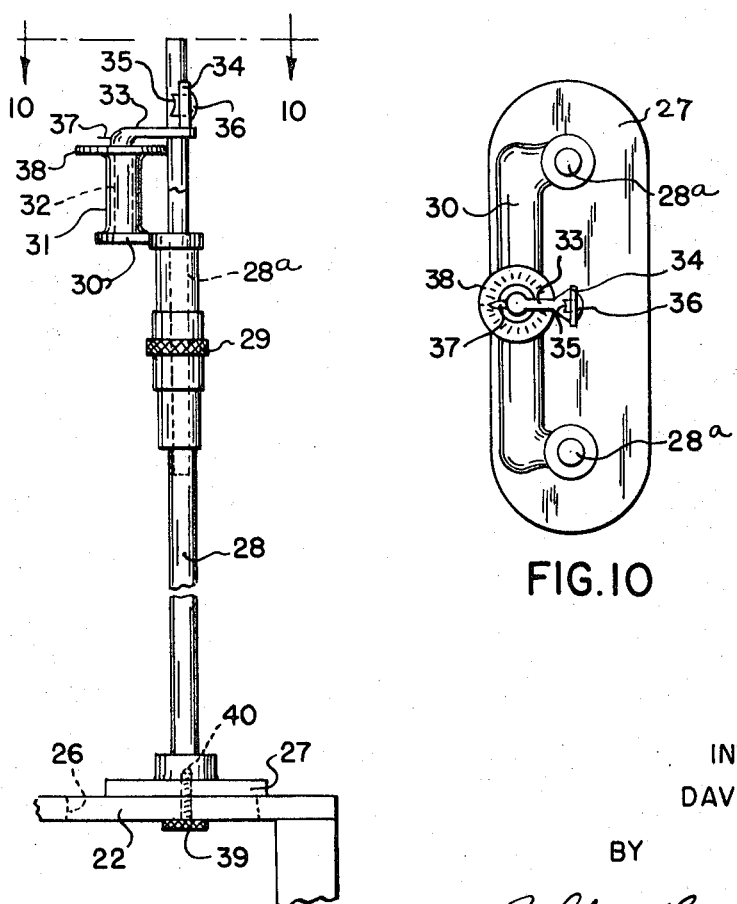

FIG. 8 is an elevational view of a lens holder positioned in the slots 26 of the table 22. The lens holder comprises a base 27 slidable along the table top. This base supports two parallel vertical rods 28, each of which has a vertically adjustable upper portion 28a adjustable by rotation of the ring or knob 29. On top of the post is supported a cross bracket 30, in the center of which directed upwardly is a vertical bracket 31 centrally of which is rotatably supported a post 32 which carries at its upper end a short arm 33, as seen in FIGS. 9 and 10, having an upward projection 34 at its end farthest from its pivot arranged so as to support either a negative conicoid surface lens 35, on one face, or a positive conicoid surface lens 36 on the other face. The position shown in FIG. 10 is to determine the eccentricity of the negative surface 35, whereas for the determination of the eccentricity of the positive surface 36, the vertically projecting support 34 must be rotated into position 180°. A pointer 37 is provided and a plate bearing indicia 38 so as to indicate, if necessary, variation of the inclination of the lens being examined from a base or zero position as indicated in FIG. 10. The lens support may be shifted lengthwise of slots 26 and positioned by screws 39 threaded into posts 28 at 40.

In order to simplify the description of this invention, it will be assumed that the anterior surface of the human cornea is a surface of revolution. Later, the specification will take into account those instances in which the cornea is not a surface of revolution, and in which there are two principal meridians.

The image of a target, produced by reflection from the non-spherical front surface of the cornea, is non-uniformly magnified, increasing in magnification toward the corneal periphery in a continuous and regular manner. Substantially the same effects are obtained when the aforementioned conicoids of revolution are used as mirror surfaces. It is thus possible to relate qualitatively and quantitatively the distortion effects of images produced by reflection from the front surface of the cornea, to the distortion effects of images produced by conicoids of revolution of known eccentricities.

This invention discloses apparatus which quantitates the amount of image distortion produced by reflection of a regular geometrically shaped target from an off-axis portion of a non-spherical surface, such the cornea, by modifying the shape or inclination of the circular target with respect to the eye in such manner, that its image produced by said area of said surface, is seen to be its axially reflected simple and regular geometrical (in this case, circular) shape. The amount of inclination required to produce said image by said area is used to indicate the eccentricity of the surface measured.

Figure 1A:
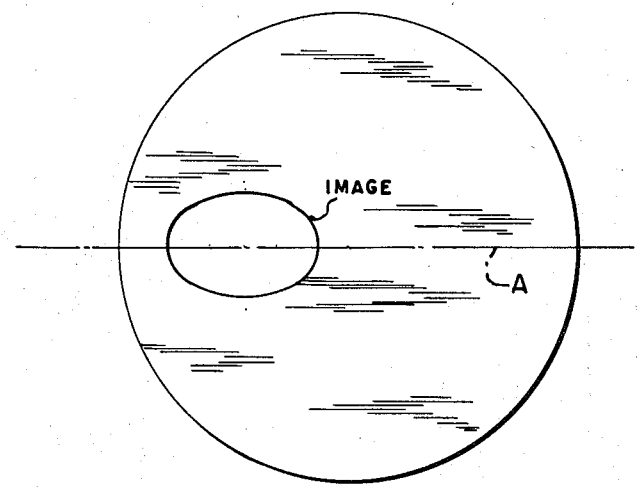
FIG. 1A is a diagrammatic showing of the off-center corneal image of a circular target.

As an example of image distortion produced by reflection from the cornea, consider a target in the form of a circular disc which faces the more peripheral portion of the cornea. The corneal image of a circular target, as viewed through an opening in the center of the circular disc target, will appear substantially elliptical, with the long or major axis of said substantially elliptical image directed toward the corneal apex as in FIG. 1A. The type of distortion depicted in FIG. 1A is that produced by almost all corneas and also produced by conicoids of revolution of the type mentioned previously. The greater the eccentricity of the conicoid, and the greater the eccentricity of the cornea, the more rapidly does the distortion manifest itself as the area of the reflecting surface involved in image formation and observation moves peripherally from the apex of said surface.

This invention utilizes a circular disc as the target for the corneal periphery, but the disc in use is made oblique to a normal direction to said corneal periphery. The obliquity is obtained by rotating the disc about a diameter, said diameter of said disc being perpendicular to a meridian plane of the cornea. As the disc is rotated about said diameter, the non-circularity of the corneal image of the disc formed by the non-spherical periphery of the cornea and viewed through an opening in the center of the disc, is gradually reduced as the disc is rotated, until at a specific amount of rotation, the image appears substantially circular. The greater the eccentricity of the cornea, the greater the distortion it produces and the greater is the amount of rotation of the disc required to cause the corneal image to appear circular.

The anterior surface of the cornea is defined as a cup shaped surface, with all curvatures positive. When the cornea is a surface of revolution, resembling conicoids, it will have an apical umbilical point, or non-astigmatic point. Elsewhere, all points on the surface are elliptic points, or astigmatic points. An image of a small circular target, produced by reflection from an area of the cornea in the immediate vicinity of an umbilical point, is circular, whereas an image produced by reflection from an area of the cornea in the immediate vicinity of an elliptic point, is substantially elliptical. Said substantially elliptical image, hereinafter referred to as elliptical, signifies that magnification in the two principal directions of said elliptic point is unequal.

At any elliptic point, there are two principal directions and two principal curvatures, with the longest radius of curvature defined as $r_1$, and the shortest as $r_2$. In the first principal meridian of an elliptic point, of radius $r_1$, one may write, by the mirror equation:

$$\frac{y_1'}{y} = -\frac{u_1'}{u} \qquad (1)$$

where $y$, the object size, is the diameter of a small circular target, $u$, is the object distance, $y_1'$ is the image size in the first principal meridian, and $u_1'$ is the image distance.

In the second principal meridian of said elliptic point, or radius $r_2$, one may write $$\frac{y_2'}{y} = -\frac{u_2'}{u} \qquad (2)$$

Dividing Equation 2 by Equation 1, there is obtained:

$$\frac{y_2'}{y_1'} = \frac{u_2'}{u_1'} \qquad (3)$$

When $u$ is large compared to $r_1$ and $r_2$, the mirror Equation $1/u + 1/u' = 2/r$ may be written, with insignificant error, for each of the two principal meridians, as:

$$u_1' = \frac{r_1}{1} \qquad (4)$$

$$u_2' = \frac{r_2}{2} \qquad (5)$$

so that Equation 3 can be rewritten as:

$$\frac{y_2'}{y_1'} = \frac{r_2}{r_1} \qquad (6)$$

Equation 6 may be stated as follows: The ratio of the image sizes corresponding to each of the two principal directions of an elliptic point on a mirror, for a small circular target at an object distance large compared to the radii of curvature in said principal directions, is proportional to the ratio of said radii of curvature.

For an elliptic point on a conicoid of revolution, i.e., a non-axial point of said conicoid, the ratio $r_2/r_1$ at said elliptic point is given by the equation:

$$r_2/r_1 = 1 - e^2 \sin 2\gamma \qquad (7)$$

where $r_2$ is the transmeridional radius of curvature at said elliptic point, and $r_1$ is the meridional radius of curvature, $e$ is the eccentricity of said conicoid of revolution, and $\gamma$ is the angle between the normal to said elliptic point and the axis of revolution of said conicoid.

Equation 7 may be written as:

$$e = \frac{(1 - r_2/r_1)^{1/2}}{\sin \gamma} \qquad (8)$$

for values of $\gamma$ other than zero. For $r_2/r_1$ in Equation 8 there may be substituted $y_2'/y_1'$ from Equation 6, so that Equation 8 can be rewritten as:

$$e = \frac{(1 - y_2'/y_1')^{1/2}}{\sin \gamma} \qquad (9)$$

Equation 9 is valid providing said circular target is extremely small and image distance $u$ is large with respect to $r_1$ and $r_2$ so that the area about said elliptic point involved in image formation is extremely small. Under these circumstances, the image produced by said non-axial elliptic point is elliptical and substantially symmetrical about said elliptic point, and $y_2'/y_1'$ is the ratio of the minor axis to the major axis of said elliptical image. Now if said small circular target is rotated about a diameter perpendicular to the meridian plane which contains the major axis of said elliptical image, it, in effect becomes an elliptical target (for the eye) whose major axis is $y$, the diameter of said target, and whose minor axis is $y \cos \phi$, where $\phi$ is the angle which the plane of said target makes with a plane tangent to the conicoid surface at said elliptic point. By means of said rotation of said small circular target about said diameter so that it in effect becomes an elliptical target, the initial elliptical image produced by the cornea can be modified to appear as a circular corneal image when the ratio of the major axis to the minor axis of the effectively elliptical target becomes equal to the ratio of the major axis to the minor axis of the elliptical image produced by said circular target prior to its rotation. Since, for the given object distance $u$, $y'$ is directly proportional to $y$, the ratio of $y_2'/y_1'$ can be measured by the amount of said rotation of said circular target, where $y_2'$ is equal to $y_1' \cos \phi$, so that Equation 9 can be rewritten as $$e = \frac{(1 - \cos \phi)^{1/2}}{\sin \gamma} \qquad (10)$$

Equation 10 can be considered the fundamental equation, which I have termed eccentroscopic, for measuring the eccentricity of a cornea or conicoid of revolution by means of the apparatus of this invention, the apparatus hereinafter being termed an eccentroscope.

In the practical application of the apparatus of this invention for the measurement of eccentricity of a cornea, the circular disc target is necessarily of a relatively large diameter so that its image can be readily seen through the telescope of the apparatus, and hence the area of the corneal surface involved in the formation of the image is significant. Since the corneal surface is decreasing in curvature from the apex to the periphery, the resulting elliptical image of said circular target is non-uniformly magnified, progressively increasing in magnification from the end nearest the corneal apex to the opposite end. Consequently, said elliptical image is not symmetrical about the normal through the elliptic point, said normal extending from the center of said circular target through said elliptic point. In order to obtain a circular image of said relatively large circular target, it is necessary that target rotation, in effect, not only narrow the target in a meridional direction, but that it also, in effect, distort the target in a meridional direction so as to compensate for said progressive magnification of said corneal surfaces. Said narrowing and said compensation both result from the appropriate rotation of the circular target, in which the edge of the target farthest from the axis of the cornea is rotated away from the conicoid surface, see FIG. 4.

In FIG. 4, not drawn to scale, I have shown, schematically, a meridian section through a corneal surface or a conicoid reflecting surface of positive curvature, and in FIG. 5 the same diagram for a surface of negative curvature. A discussion of FIG. 4 follows, it being understood that it applies to FIG. 5 also. The plane of said meridian section (the plane of the paper) is perpendicular to a circular target along a diameter OT, said target appropriately rotated so that it has the required compensation to produce a circular image, as viewed through the telescope, having a diameter O'T'. Assume that point E of FIG. 4 is the center of the entrance pupil of the telescope of the apparatus and that it lies at the center of the circular target.

By inspection of FIG. 4, it can be seen that angle $OP_1E$ for the half of the section through the rotated target nearest the cornea or conicoid reflecting surface is larger than the angle $EP_2T$ for the half of the section through the rotated target farthest from the cornea, or positive conicoid surface. As an example, consider a cornea with an apical radius of curvature of 8 mm. and an eccentricity of 1. For eye rotation of 26°, a circular target 5 cm. in diameter, whose center is 15 cm. from the cornea, when rotated to produce a circular image as seen from the center of the target, involves an area of cornea about 1.5 mm. in diameter, which subtends an angle of about 0.6° to point E, the center of the entrance pupil of the telescope. This angle $P_1EP_2$ is quite small compared to angles $OP_1E$, 9.2°, and $EP_2T$, 7.9°, so that without significant error, tan $OP_1E$ may be considered equal to tan OAE, and tan $EP_2T$ may be considered equal to tan EAT. The following approximation may then be written:

$$\frac{\tan OP_1E}{\tan EP_2T} = \frac{k + d \sin \phi}{k - d \sin \phi} \qquad (11)$$

where $k$ is the distance EA from point E to the cornea, and $d$ is the semi-diameter EO of the target.

By inspection of Equation 11, it can be seen that for a given target distance $k$ and target rotation $\phi$, a very small value of $d$, wherein a very small area of the cornea is involved in the formation of the viewed image, results in the ratio of said angle tangents being nearly 1, the condition of minimum target compensation required to produce a circular corneal image. With a larger value of $d$ and a correspondingly larger area of cornea of progressively changing curvature involved in the formation of the image of said target, the ratio of said angle tangents increases such that the rotated target is, in effect, progressively distorted with respect to the corneal or conicoid reflecting surface so as to compensate for the progressive magnification of the image produced by said surface, enabling the production of a circular image.

For any given angle $\gamma$, the amount of rotation of the circular target to measure the eccentricity of a conicoid surface, is greater as the eccentricity of the surface is greater. With increased eccentricity, the distorting effect of the progressively changing curvature of the corneal surface is greater. By inspection of Equation 11, it can be seen that as $\phi$ is increased for the higher eccentricity surfaces, the ratio of said angle tangents increases; hence the additional rotation of the target required for measuring said higher eccentricity surfaces, increases the effective distortion of said circular target with respect to the reflecting surface so as to compensate for the increased progressive magnification of said higher eccentric surfaces, thereby enabling the production of a circular corneal image.

Thus, as a result of the distortion compensating effect of target rotation, the fundamental Eccentroscope equation, Equation 10, remains valid even though a relatively large circular target is used.

As stated earlier, $\gamma$ is the angle between the axis of revolution of the cornea and the normal through the elliptic point of said cornea, extending from the center of the circular target. To present the target to an off-axis portion of the cornea, the target remains fixed and the eye rotates about its center of rotation. A small discrepancy arises if it is assumed that the angle which the eye rotates about its center of rotaiton is equal to $\gamma$. This discrepancy is negligible.

When the cornea has an elliptic point at its apex, i.e., is astigmatic where it is intersected by its axis of symmetry, the image of a circular target formed by the cornea about said elliptic point, will be elliptical. However, in most cases the image is only slightly elliptical so that the term "substantially circular" in the claims is intended to include this condition. For such a cornea, the determination of the eccentricity in each of the principal meridians follows the same procedure as in the base where the cornea is a surface of revolution, with the exception that for a given angle $\gamma$, instead of rotating the circular target until its image appears circular, it is rotated until its image appears to have the same elliptical shape as the elliptical image of a circular target formed by the corneal apex. When said elliptical image shape is used as the criteria for rotation of the circular target, the value obtained for the eccentricity in each meridian will be well within the degree of tolerances of corneal measurement required for the fitting of contact lenses.

The line of sight of the eye generally does not coincide with the axis of revolution of the cornea, but is directed about 5° nasally, said angle being commonly designated by the symbol $k$, with said line of sight intersecting the cornea approximately 0.5 mm. nasal to the corneal apex. Angle $k$ is compensated for by providing fixation points on the apparatus whereby the examined eye, in fixating said points, rotates approximately 10° more nasally than temporally. In this way, the areas of the cornea involved in the measurement of eccentricity in both halves of a corneal meridian, will be substantially symmetrical with respect to the corneal apex. Such fixation points are shown in FIG. 3, where points L1 and R1 are the fixation points for the right eye, and points L3 and R3 are those for the left eye. Points L2 and R2 are used as fixation points when it has been determined that angle $k$ is negligible, as may be the case in an eye with a large amount of myopia. The effect of angle $k$ upon the value of angle $\gamma$ is reduced to a negligible amount by averaging the eccentricity values obtained for each side of the cornea along a given meridian. The use of the telescope has the effect of enlarging the corneal image so that it is readily seen, and it also critically fixes the apparatus distance with respect to the corneal image upon which it is focused. The object distance may be varied, if desired, by adjustment of the objective lens of the telescope.

Fixation points L1R1 and L3R3 are so provided that angle $\gamma$ is about 30° for each direction of gaze of the eye being examined. The central point of the circular corneal image resulting from appropriate rotation of target is then about 4.5 mm. from the corneal apex, there being some variation depending upon the apical radius of curvature and eccentricity of the cornea.

There will now be outlined in a series of steps the procedure for determining the eccentricity of the cornea by the apparatus of this invention.

(1) The patient is seated with head erect and eyes directed straight forward, facing the examiner.

(2) The examiner is seated in front of the patient and facing him, holding the Eccentroscope vertically by means of handles 13 and 17.

(3) Target 14 of the Eccentroscope is adjusted to the zero position and telescope 16 is adjusted to the primary position for the preferred object distance.

(4) The examiner observes the patient's right eye through telescope 16 while the patient directs his gaze to the center of the opening 14a in target 14. Base 10 will then be perpendicular to the line of sight of the examined eye.

(5) The examiner moves toward and away from the patient's right eye until the corneal image of target 14 is seen sharply focused through telescope 16.

(6) The position of the image of target 14 with respect to the center of the cornea is noted and the shape of said image is also noted, i.e., whether it is circular or elliptical.

(7) If the corneal image of target 14 is circular and if the position of the image is displaced nasally with respect to the center of the cornea, as is usually the position, the patient will use fixation points L1 and R1; if the position of the corneal image is centered with respect to the cornea, the patient will use fixation points L2 and R2, or if the corneal image of target 14 is directed temporally with respect to the center of the cornea, as may occur in an eye with considerable myopia, the patient will use fixation points L3 and R3.

(8) The patient is asked to maintain head position and to direct his gaze towards either L1, L2, or L3, depending upon the examiner's observation in step 7.

(9) The examiner then observes the elliptical corneal image of target 14 produced by the periphery of the cornea of the rotated eye, and then slowly rotates target 14 by means of handle 13 such that the edge of target 14 farthest from the axis of the cornea is moved away from the cornea, continuing such rotation until the image seen through the telescope is circular. The eccentricity indicated by pointer 18 is noted on scale 19.

(10) The patient is then asked to direct his gaze to the corresponding opposition fixation point (either R1, R2, or R3, respectively, as determined from steps 6 and 7) and step 9 is repeated. The eccentricity indicated by pointer 18 is noted on scale 19.

(11) The results obtained in steps 9 and 10 are averaged to obtain the eccentricity of the cornea in the meridian of measurement.

(12) The Eccentroscope may be rotated about the axis of the telescope by means of handles 13 and 17 and steps 9, 10 and 11 repeated in other meridians, if desired.

(13) If previous ophthalmometry indicates astigmatism at the corneal apex, or if the image seen in step 6 is elliptical, indicating astigmatism at the corneal apex, the Eccentroscope is rotated about the axis of the telescope until target support shaft 11 appears perpendicular to the long axis of the elliptical image. When said long axis is substantially horizontal (with-the-rule astigmatism) steps 8 through 11 are followed with the exception that target 14 is rotated until the corneal image seen through telescope 16 is of the same shape as that seen in step 6.

(14) The Eccentroscope may then be rotated 90° about the telescope axis, and with the patient using fixation points L2 and R2, step 13 is repeated.

(15) If in step 13 the long axis of the elliptical image produced by the corneal apex is substantially vertical, (against-the-rule astigmatism) and with the Eccentroscope rotated about the axis of the telescope such that target support shaft 11 is perpendicular to said long axis, the patient utilizes fixation points L2 and R2, and steps 8 through 11 are followed with the exception that target 14 is rotated until its corneal image seen through telescope 16 is of the same shape as that seen in step 6.

(16) The telescope may then be rotated 90° about the telescope axis, and with the patient utilizing fixation points L1 and R1, step 15 is repeated.

By following the above series of steps, the eccentricity of the cornea may be determined when it is a surface of revolution, or, in the case of astigmatism, the eccentricity in each of two principal meridians of the cornea may be determined.

The operation of the modification of FIGS. 8, 9 and 10 is like that already described in connection with the human cornea. When working on the conicoid surface of positive curvature 36, the procedure is like that explained in connection with the human cornea and conforming to the teachings of the diagram of FIG. 4. In working with a conicoid surface of negative curvature as shown at 35, the procedure is the same as described in connection with the steps for use with the human cornea and the diagrammatic explanation is shown in FIG. 5. The relation of the conicoid surfaces 35 and 36 to the pivot 32 is approximately such that the conicoid surface may be rotated, to set angle $\gamma$, about a point on its axis of revolution between the center of curvature of the apex of the conicoid surface and a point about 1.5 times its radius of apical curvature. Any variation from this rule is acceptable commercially in this modification, but, if necessary or desirable, this exact relationship may be satisfied by varying the length of arm 33 and by varying the distance between pivot 32 and the vertical projecting lens support 34 at the end of arm 33.

What is claimed is:

1. A unitary portable and hand held apparatus for determining the eccentricity of a conicoid surface comprising a generally planar ring shaped hollow frame base; a linear shaft rotatably mounted in said base on a vertical center line of said ringed shaped hollow frame base and extending below said frame to provide a first handle there for rotating said shaft; a circular disc target having a central through opening; means interrupting the intermediate portion of said shaft and mounting said target there with a vertical axis of said target in line with the axis of rotation of said shaft; a generally U-shape bracket extending rearwardly in a plane which is perpendicular to the palne of said hollow frame and having its opposite ends rigidly fixed to opposite sides of said hollow frame; a telescope mounted in the base portion of said U-shaped bracket directed toward said target and with its optical axis passing through the center of said circular disc target; a pointer fixed to said shaft and extending radially therefrom; indicia-carrying means rigidly supported on said frame in position to coact with said pointer to indicate the angular rotation of said shaft and target from a reference position where said target lies substantially in the plane of said hollow frame; and a second handle for supporting said apparatus before an individual to be examined rigidly and coplanarly fixed to a lateral side portion of said frame, said apparatus further including means supporting sight fixation points on said base approximately on a horizontal center line through said hollow frame at right angles to said shaft, said points including a pair of laterally spaced points at each side of said frame, each pair including a left-hand point and a right-hand point, the points of the same hand spaced for gaze fixation for examination respectively of an image of said target reflected nasally or temporally with respect to the center of an eye being examined.

References Cited

UNITED STATES PATENTS 3,482,904    12/1969    Volk.

DAVID SCHONBERG, Primary Examiner

P. A. SACHER, Assistant Examiner